Aug. 27, 1963    R. G. YOUNG    3,101,558
APPARATUS FOR DISPLAYING SELECTIVELY CHANGEABLE COLORS
Filed April 28, 1961    9 Sheets-Sheet 1

Inventor
Ronald G. Young
By McCanna, Morsbach & Pillote
Atty's

Aug. 27, 1963    R. G. YOUNG    3,101,558
APPARATUS FOR DISPLAYING SELECTIVELY CHANGEABLE COLORS
Filed April 28, 1961    9 Sheets-Sheet 2

Inventor
Ronald G. Young
By
McCanna, Morsbach & Pillote
Atty's

Aug. 27, 1963   R. G. YOUNG   3,101,558
APPARATUS FOR DISPLAYING SELECTIVELY CHANGEABLE COLORS
Filed April 28, 1961   9 Sheets-Sheet 3

Inventor
Ronald G. Young
By
McCanna, Morsbach & Pillote
Atty's

Aug. 27, 1963  R. G. YOUNG  3,101,558
APPARATUS FOR DISPLAYING SELECTIVELY CHANGEABLE COLORS
Filed April 28, 1961  9 Sheets-Sheet 6

Inventor
Ronald G. Young
By McCanna, Morsbach & Pillote
Atty's

Aug. 27, 1963  R. G. YOUNG  3,101,558
APPARATUS FOR DISPLAYING SELECTIVELY CHANGEABLE COLORS
Filed April 28, 1961  9 Sheets-Sheet 7
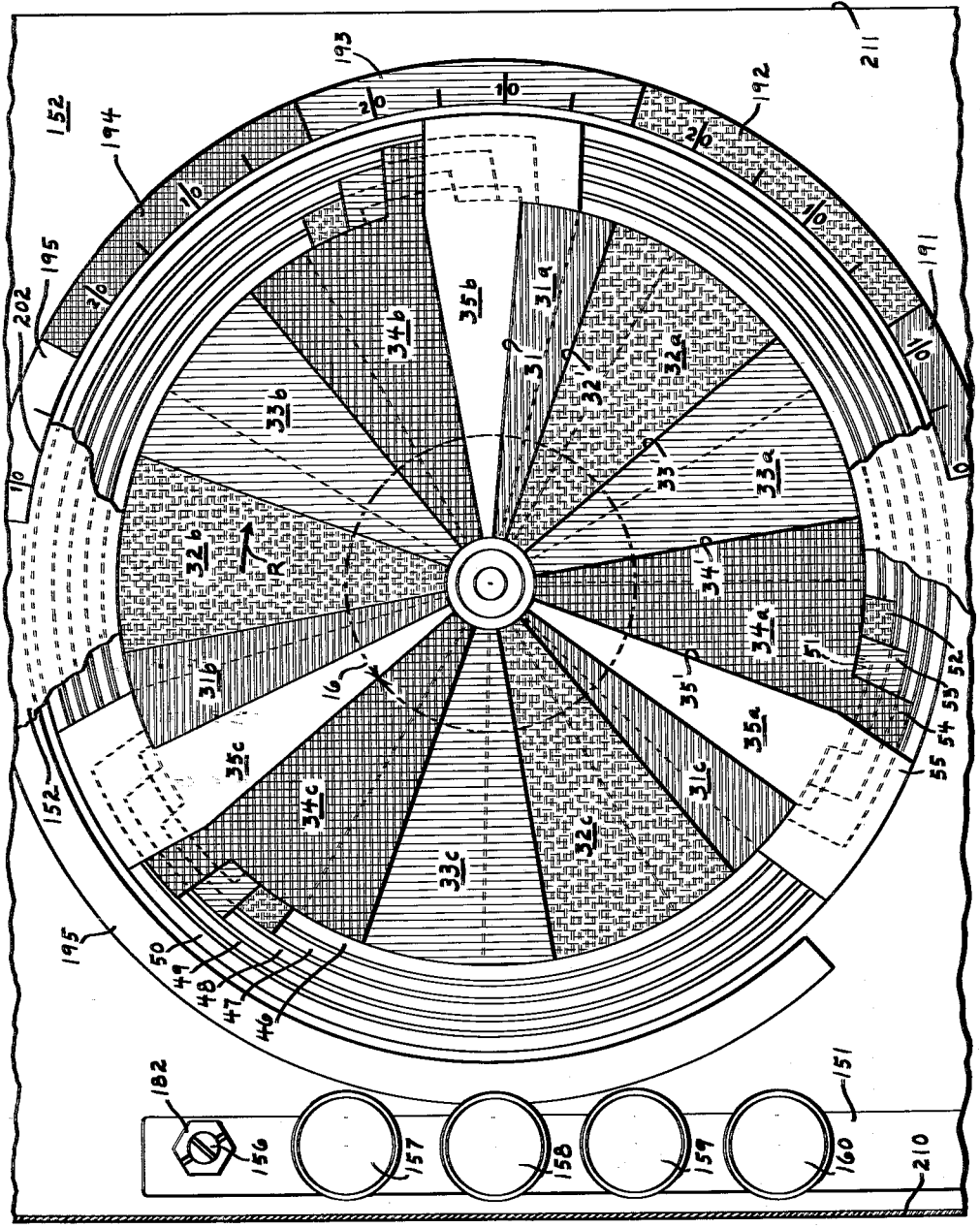

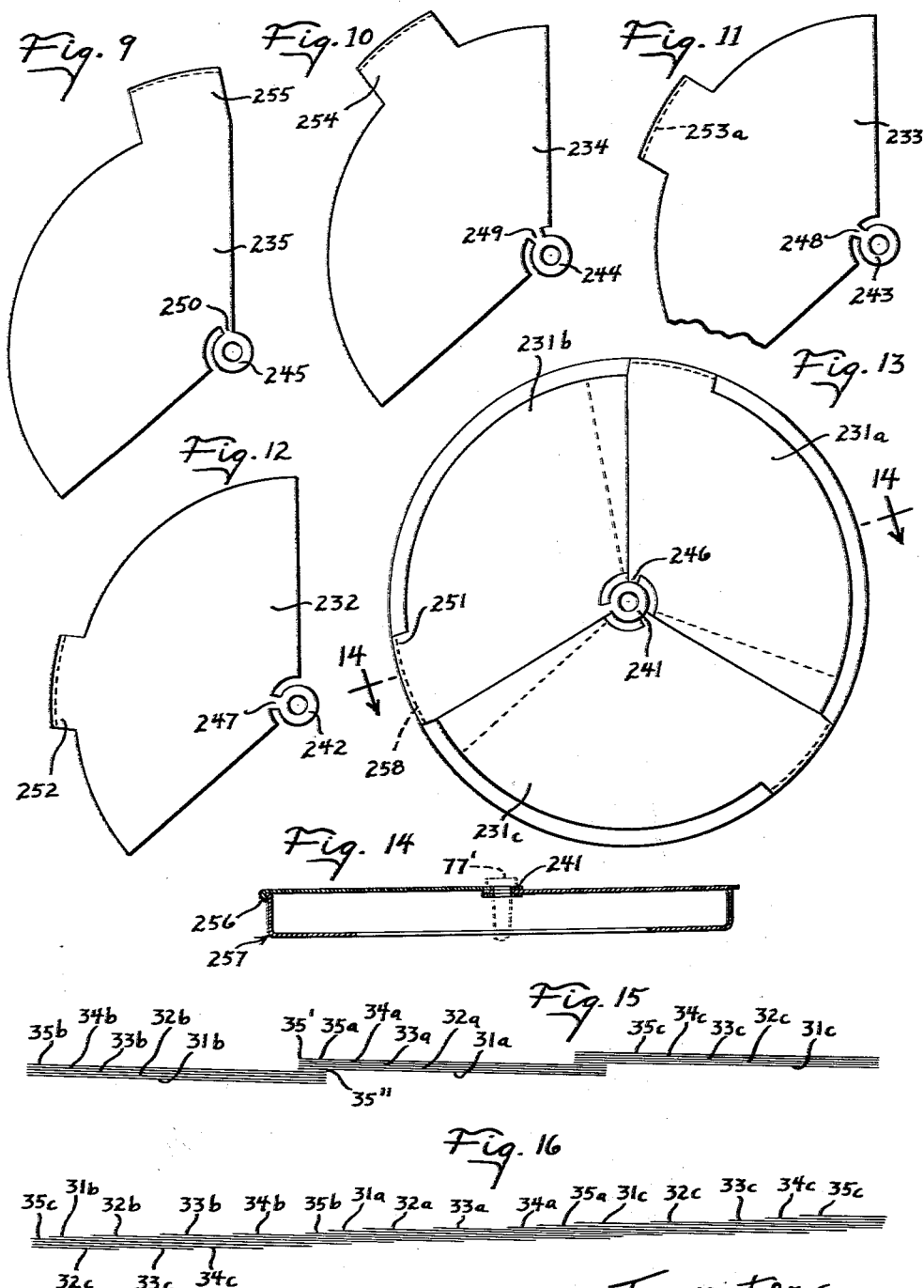

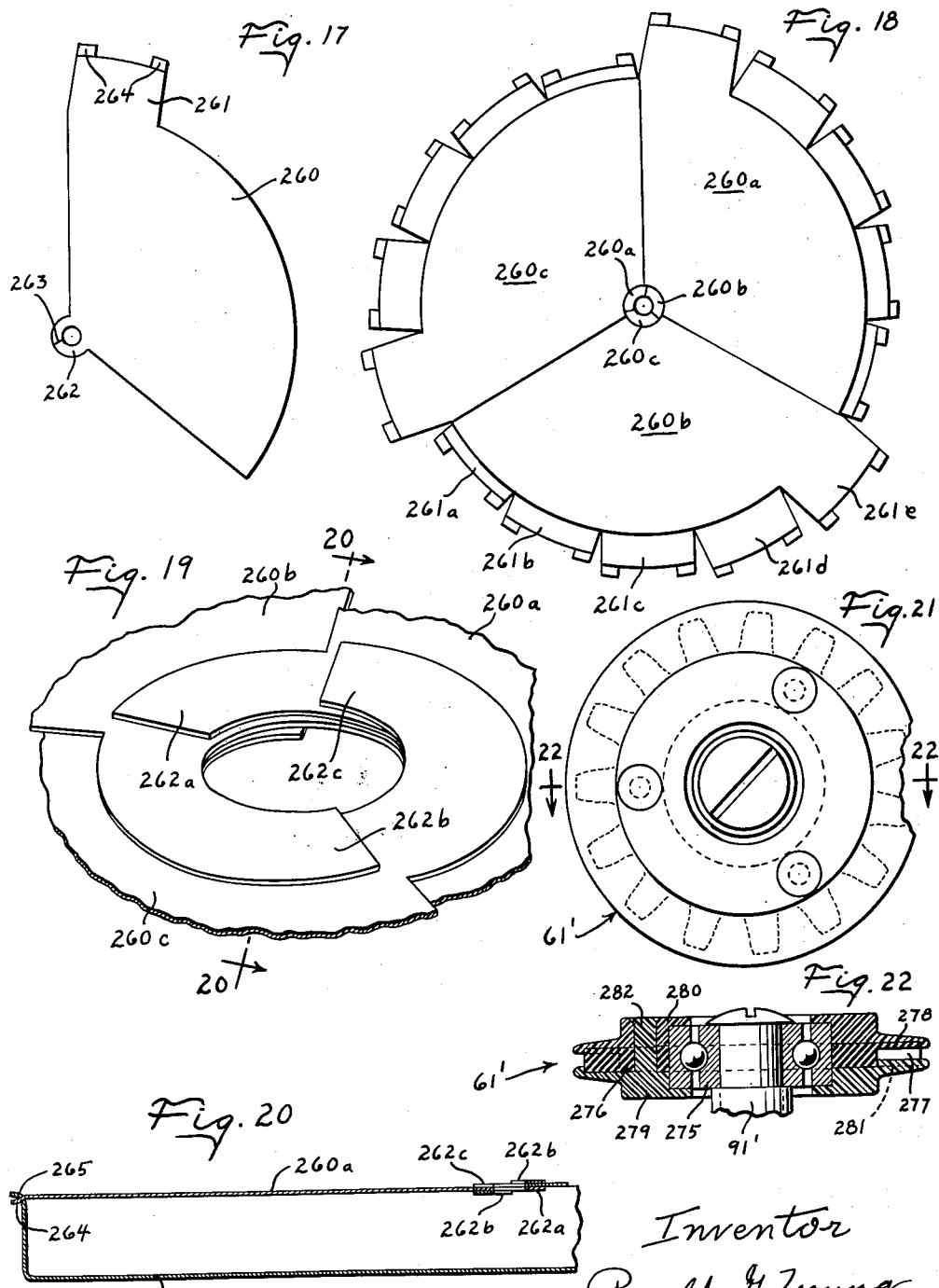

_United States Patent Office_

3,101,558
Patented Aug. 27, 1963

---

3,101,558
APPARATUS FOR DISPLAYING SELECTIVELY CHANGEABLE COLORS
Ronald G. Young, Rockford, Ill., assignor, by mesne assignments, to The Valspar Corporation, Rockford, Ill., a corporation of Delaware
Filed Apr. 28, 1961, Ser. No. 106,330
32 Claims. (Cl. 35—74)

This invention relates to an apparatus for displaying selectively changeable colors.

The present invention is generally adapted for displaying colors of selectively changeable hue, and in varying brightness and value. The invention is useful in a system of color notation in which colors are identified by reference to appropriate ones of standardized color panels on the apparatus and the relative amounts of each. In such a system of color notation, it is only necessary to standardize the colors on the several panels of the apparatus to effectively standardize the entire color notation system. The invention is also useful in conjunction with a colorant mixing system for producing paints, dyes, colored ceramics and the like and can be correlated therewith to enable selective display of the colors which can be produced by the colorant mixing system. Alternatively, the invention can be adjusted to display a color to match an unknown color and to indicate the color composition of the matching color. When correlated with a colorant system, the device will thus enable reproduction of the matching color by the colorant mixing system.

The apparatus includes a plurality of color panels which are adjustable relative to each other to expose or display any single color panel, or selectively variable portions of a plurality of panels, and the several panels are rotated in unison to optically mix the colors on the exposed portions of the panels. The apparatus is thus adjustable to display a wide variety of different colors including the colors on the different panels and mixtures thereof. Certain of the panels are advantageously colored with different so-called primary hues, and others of the panels are colored black and white to enable production of different chromatic colors by intermixing two or more primary hues of adjacent frequency; to enable changing of the brightness and value of the hues by intermixing black and white therewith, and to also enable the production of achromatic colors.

An important object of this invention is to provide a color display device for use in a system of color notation, and which enables the color notation system to have a wide range and to be easily standardized.

Another object of this invention is to provide a color display device for use in conjunction with a colorant mixing system and which is readily presettable to display the different hues and shades which can be attained by the system and which, conversely, can be used to match an unknown color and to indicate the color composition thereof to enable reproduction of that color by the colorant mixing system.

Another object of this invention is to provide a color display device of the type having a plurality of different color panels which are rotatable to optically mix the exposed portions of the color panels, and having a novel arrangement for adjusting the exposed portions of the panels while they are rotating to selectively vary the hue, brightness and value of color being displayed.

Another object of this invention is to provide a color display device of the type in which each of the different colored panels extend through at least 360° and can be adjusted to expose the single color on any one of the several panels to display the same in its maximum brightness as well as selectively variable portions of different ones or all of the different color panels to produce colors of different hue, brightness and value.

Another object of this invention is to provide a color display device having a plurality of different color panels which are rotatable to optically mix the exposed portions thereof, and which device has indicator means readable while the color panels are rotating to indicate the relative exposed areas of the different color panels and hence to indicate the color composition of the color being displayed.

Yet another object of this invention is to provide a color display device including a plurality of rotary color panels, which display device is of compact construction and which yet displays a large mass of the selected color.

An important feature of the present invention resides in the provision of a color display apparatus having a stack of differently colored disks, with each disk including a plurality of sectors having a total angular extent of at least 360°, and in which the sectors of the different disks are interleaved and mounted for relative adjustment to enable movement of any of the disks wholly or partially in front of the stack.

Another feature of this invention resides in the provision of a color display device in accordance with the foregoing feature and having an improved arrangement for mounting the sectors of the different color disks to firmly support the same for rotation and for limited angular movement relative to each other.

A further feature of this invention resides in the provision of a color display device having a stack of rotary colored disks, and a planetary-type drive for driving the several color disks in unison and for angularly adjusting the disks relative to each other while the disks are rotating.

Still another feature of this invention resides in the provision of a color display apparatus in accordance with the foregoing feature and having calibrated indicators operatively connected to the relatively stationary elements on the planetary gear drive, and which indicators thereby indicate the relative positions of the rotating colored panels and hence the color composition of the color being displayed.

Another feature of this invention resides in a simplified arrangement for operatively interconnecting individual ones of a plurality of stacked elements to respective ones of an aligned stack of elements to effect rotation of the interconnected elements in the two stacks in unison.

These together with various ancillary objects and features of the present invention will be more readily appreciated as the same becomes better understood by reference to the following detailed description when taken in connection with the accompanying drawings wherein:

FIGS. 4, 5 and 6 are rear exploded perspective views of the color disks; the planetary gear drive for the color disks, and the control apparatus for angularly adjusting the color disks relative to each other, respectively;

FIG. 8 is another front view of the color display device, and illustrating the color disks in relatively different angularly adjusted positions, and with part of the front wall of the housing broken away to illustrate details of construction;

FIGS. 9-12 illustrate different color sectors having a modified arrangement for mounting the same;

FIG. 13 is a view illustrating the manner of assembling one set of color disks on its carrier;

FIG. 14 is a transverse sectional view taken on the plane 14—14 of FIG. 13;

FIG. 15 is a diagrammatic sectional view taken on the line designated 15 in FIG. 7, and illustrating the color panels in the normal position thereof;

FIG. 16 is a diagrammatic sectional view taken on the line designated 16 in FIG. 8 and illustrating the color panels in a different relatively adjusted position thereof;

FIG. 17 is a view of a different type of color sector having a further modified arrangement for mounting and supporting the same;

FIG. 18 is a plan view illustrating color sectors of the type shown in FIG. 17 assembled in a stack;

FIG. 19 is a fragmentary perspective view illustrating the manner in which the hubs on one set of color sectors of the type shown in FIG. 17 interleave with each other;

FIG. 20 is a fragmentary sectional view through one set of color sectors taken on the plane 20—20 of FIG. 19 and illustrating the same mounted on a carrier;

FIG. 21 is a plan view of a modified form of planetary pinion gear; and

FIG. 22 is a sectional view taken on the plane 22—22 of FIG. 21.

Figure 4:
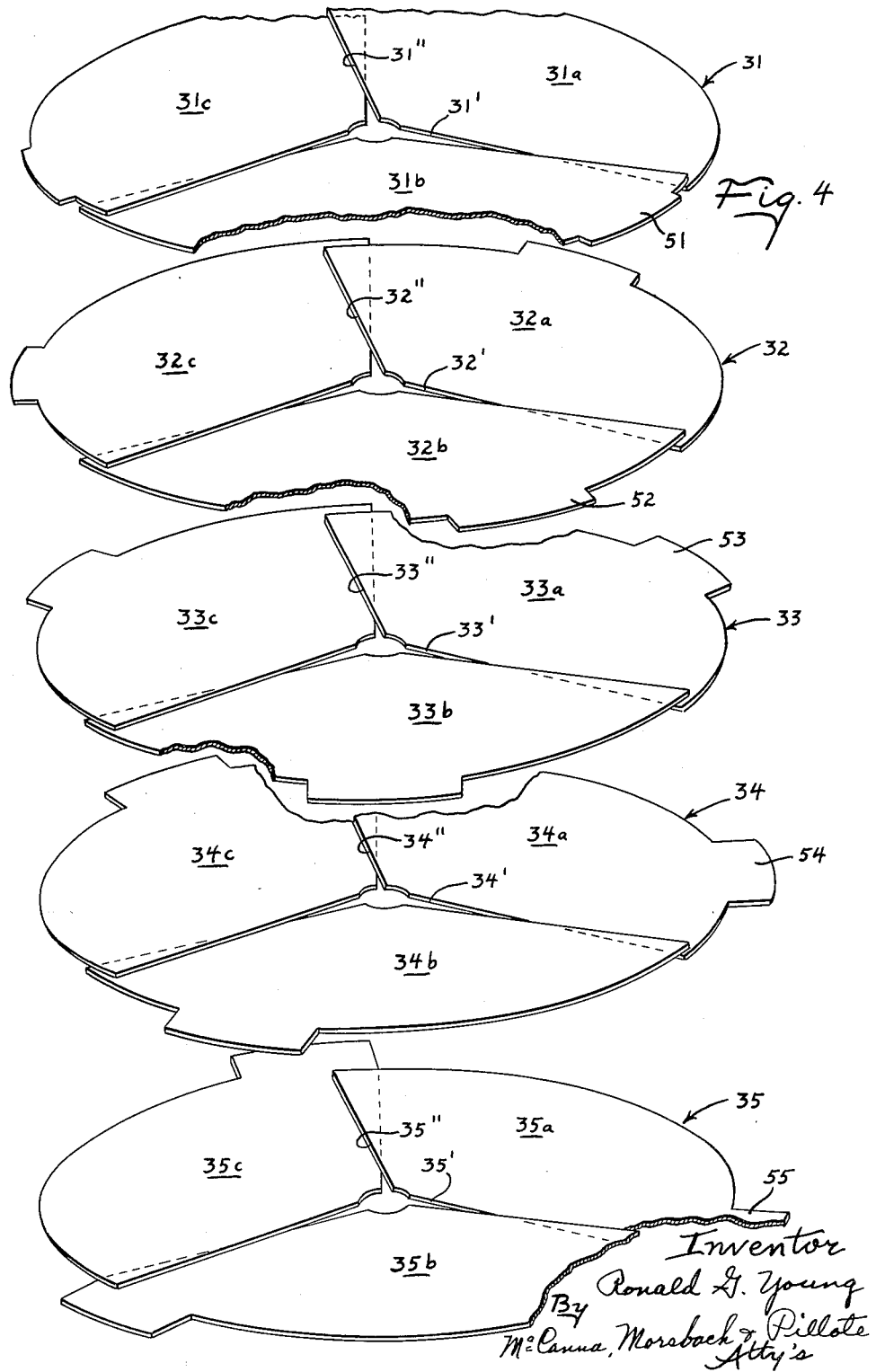
FIGS. 4, 5 and 6 are rear exploded perspective view
Figure 7:
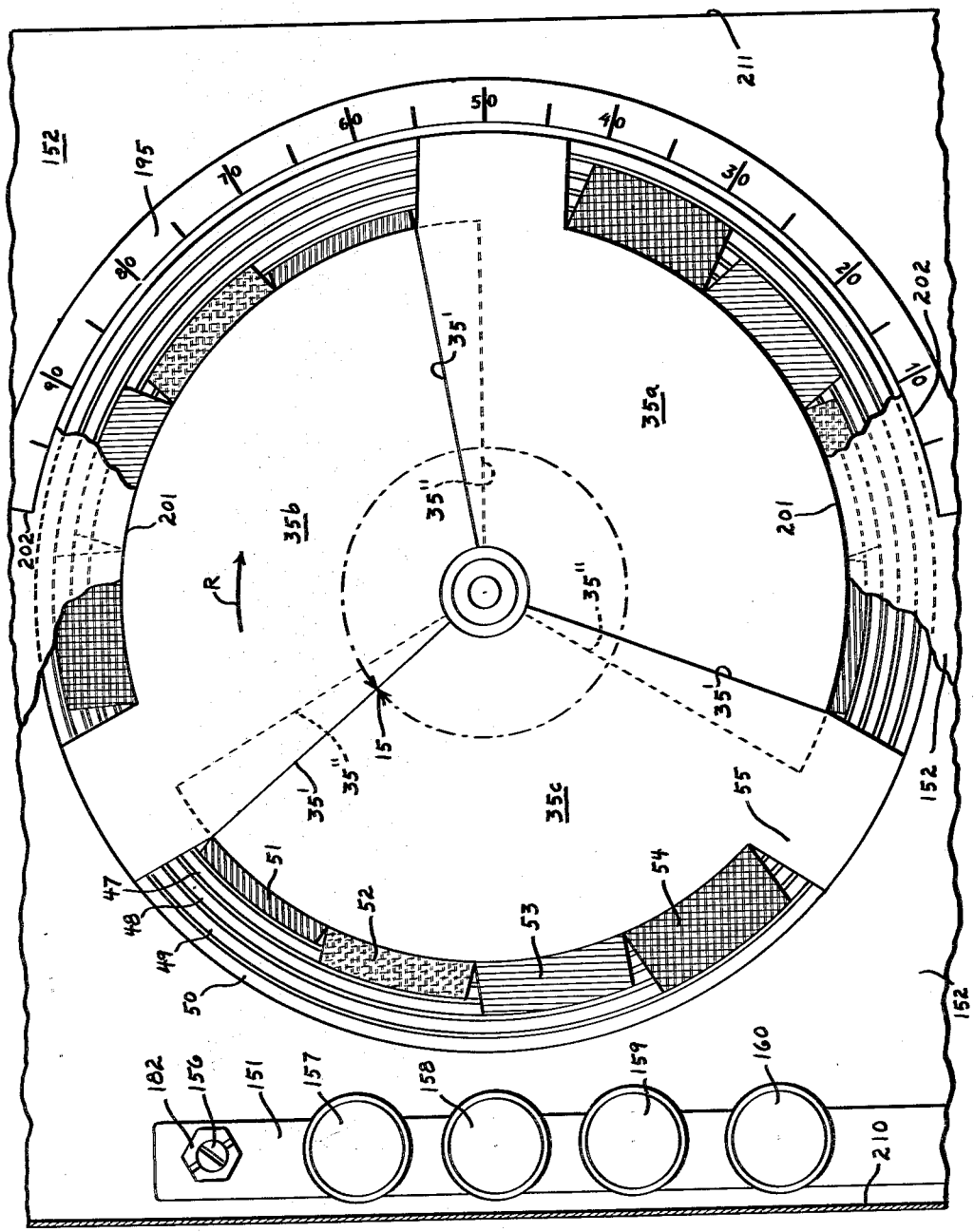
FIG. 7 is a front view of the display device illustrating the color disks in one angular position thereof, and with part of the front wall of the housing broken away to illustrate details of construction.

The color display device comprises a plurality of color panels or disks, herein shown five in number and designated 31-35 it being understood that a different number of color disks could be used if desired. The disks 31, 32 and 33 are advantageously colored with the so-called "primary" hues, such as blue, yellow and red respectively, and the panels 34 and 35 have their faces colored black and white respectively. The panels are formed of a thin resilient sheet stock such as metal, plastic or the like and are advantageously formed in a plurality of sectors to reduce the speed at which the disks must be rotated to optically mix the colors on the exposed portions thereof. As shown, each disk includes three separate sectors respectively designated by the suffix letters $a$, $b$ and $c$. The total extent of the several sectors is made at least 360°, and preferably slightly greater as shown in FIGS. 4, 7 and 8 so that the generally radially extending edges designated by the superscript symbols (') and (") of each sector overlap the edges of the adjacent sectors a small amount, of the order of 5 or 10°.

Figure 3:
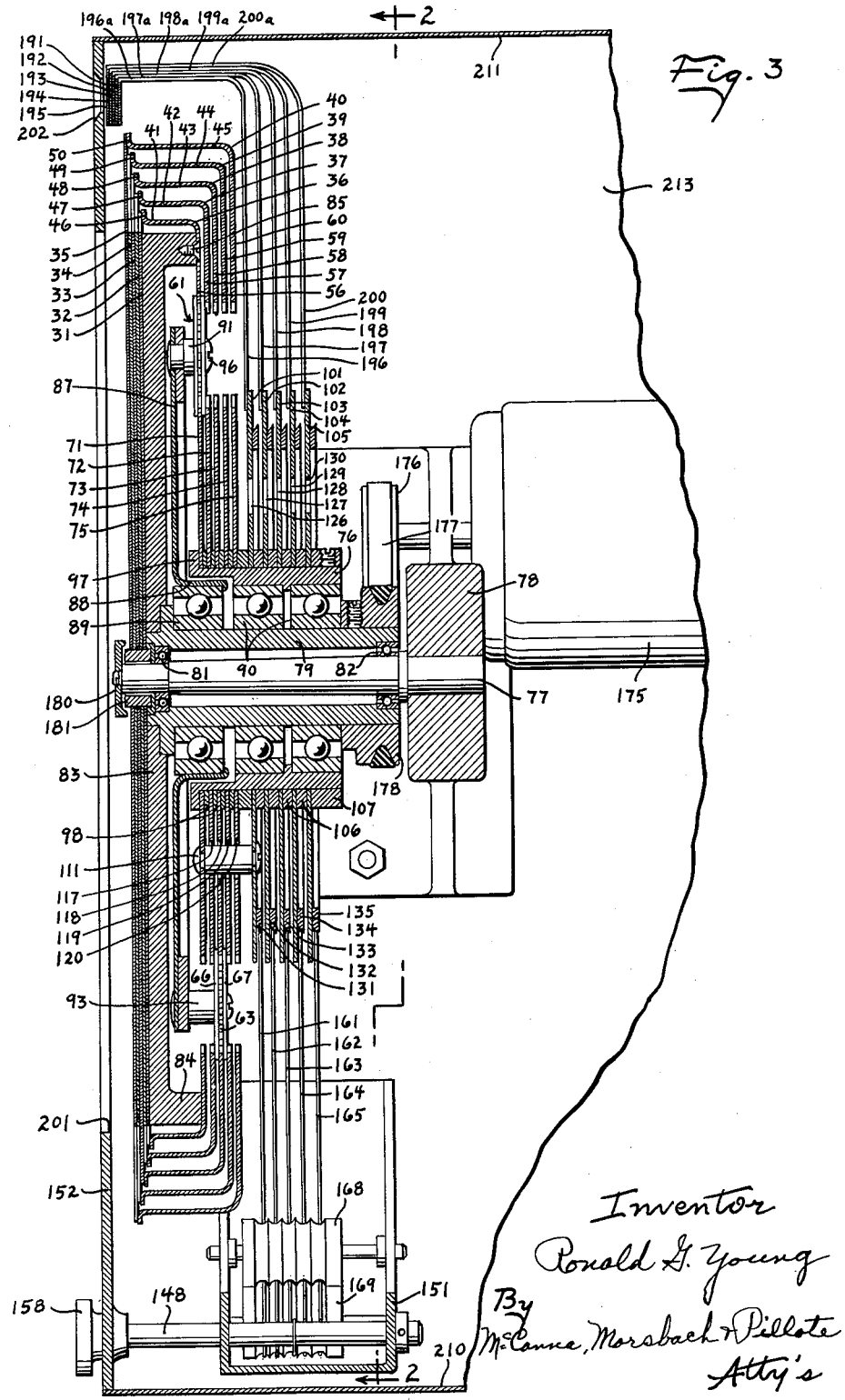
FIG. 3 is a horizontal sectional view through the display device, taken on the broken line 3—3 of FIG. 2.
Figure 5:
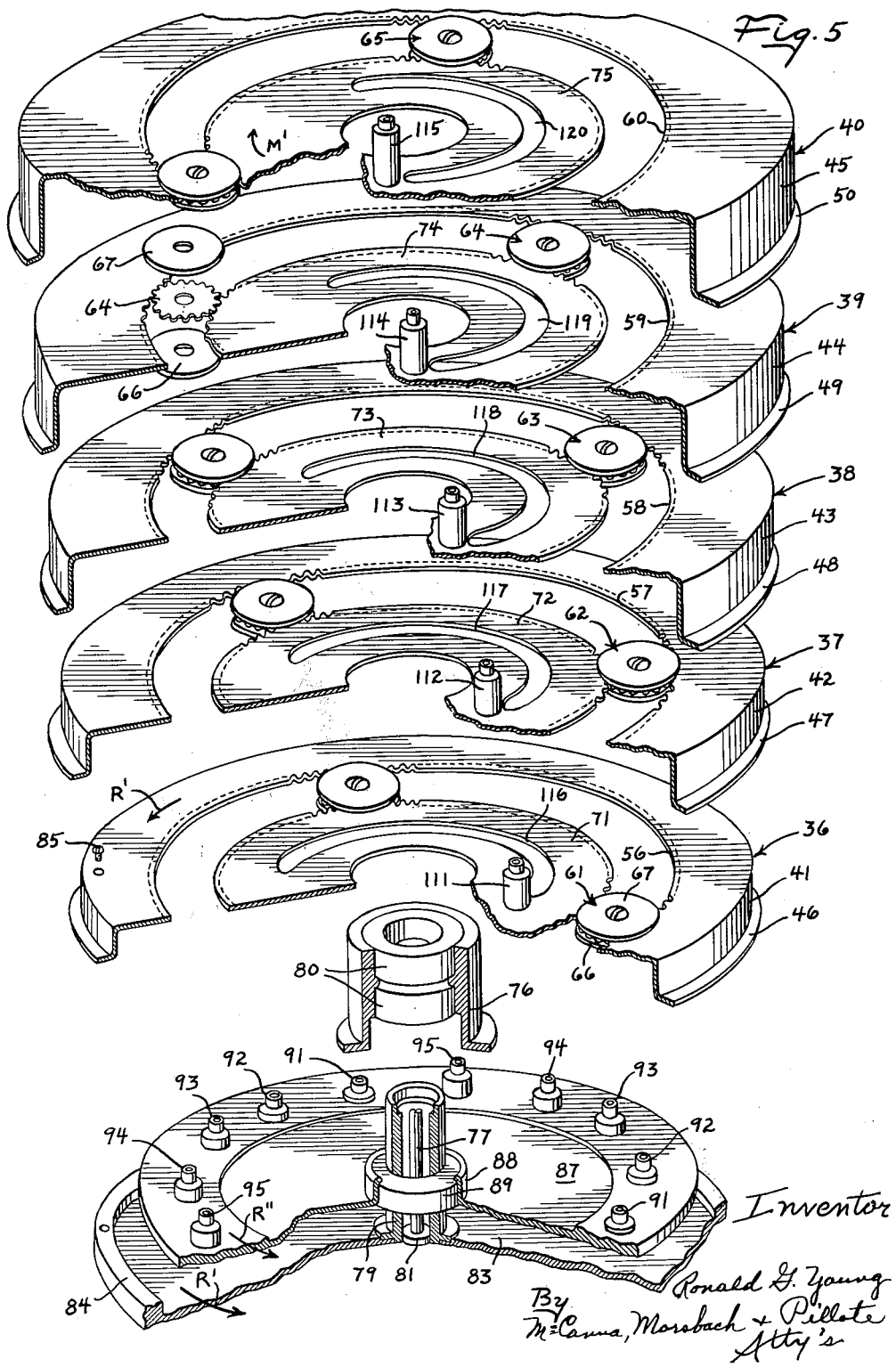

In accordance with the present invention, the several sectors which form each color disk 31-35 are attached to an individual annular carrier designated 36-40 respectively. The sectors are attached to the carriers adjacent the outer periphery of the sectors and the carriers function to support the several sectors of each disk in fixed angular relation with respect to each other, and to also support and drive the color panels from adjacent their outer periphery. As best shown in FIG. 5, the annular carriers 36-40 have radially spaced ring portions 41-45 disposed in concentric relation to each other and outwardly extending flange portions 46-50 disposed in axially stepped relation. As best shown in FIG. 3, the axial offset between adjacent flanges is approximately equal to the thickness of individual ones of the color panels 31-35. The color panels 31-35 have tabs or ears 51-55 which extend outwardly of the periphery of each sector, and which are attached to the flanges 46-50 respectively of the carriers, as by solder or the like. As will be noted, the tabs 51-55 have a progressively increasing length, in accordance with the radial positions of the flange portions 46-50 on the respective carriers. In addition, the tabs or ears 51-55 on the several color panels are each angularly offset from the tabs or ears on each of the other color panels when the panels are stacked with their edges in substantial alignment as shown in FIG. 7. For reasons set forth more fully hereafter, the angular width of the tabs 51-55 is made no greater than $$\frac{360°}{n}$$

where $n$ is the total number of sectors in the display device. In the specific embodiment illustrated there are five color panels and each color panel is separated into three sectors so that there is a total of 15 sectors. Under these conditions, the tabs 51-55 should have an angular width of no more than 24°.

In the embodiment illustrated, the color panel 35 is disposed at one end of the stack and, as previously mentioned, one edge 35' of each sector overlaps the edge 35" of the next adjacent sector. The sectors are supported at the inner end of the stack in a manner described hereinafter to prevent the wind at the inner side of the stack from lifting the sectors. In order to prevent the wind from lifting the thin flexible sectors at the outer face of the stack, when the color panels are rotated at a relatively high speed, it is preferable to rotate the color panels in a direction (clockwise as indicated by the arrows R in FIGS. 7 and 8) such that the trailing edges 35' of the sectors overlap the leading edges 35" of the adjacent sectors at the outer face of the stack, as shown in the front views of FIGS. 7 and 8. Thus, the trailing edge 35' of each sector, such as sector 35a, retains the lead edge 35" of the next adjacent sector such as 35b and prevents the wind or air at the outer face of the stack from entering under the leading edge of the sectors. The sectors of each of the panels 31-35 overlap in the same manner and the sectors of the panels 31-34 which are disposed behind the panel 35 each have the trailing edges thereof interposed between the overlapping portions of the sectors on the front panel, as is best shown in FIG. 15. FIG. 4 illustrates the rear faces of the several color panels, and, as shown therein, the lead edges such as 35" of the sectors are exposed at the rear side of the panel. As previously noted, however, the sectors are otherwise supported at the rear or inner side of the stack.

Provision is made for rotating the color panels in unison, at a suitable speed sufficient to effect optical intermixing of the colors on the exposed portions of the stack of color panels and for selectively angularly adjusting the color panels relative to each other to vary the exposed portions of the different color panels. The speed at which the color panels should be rotated will vary with the number of sectors in each panel, and, for the panels having three sectors as illustrated in the drawings, a speed of about 800 r.p.m. is sufficient. In addition, the angle through which the color panels must be adjustable to enable any selected one of the color panels to be completely exposed at the front side of the stack, will also vary with the number of sectors in each panel. The angular adjustment must be at least $$\frac{360°}{n'}$$

where $n'$ is the number of sectors in each panel. Thus, in the embodiment illustrated wherein the panels each have three sectors, the panels must be angularly adjustable relative to each other through an angle of 120°. In accordance with the present invention, a planetary-type drive is provided for rotating the panels in unison, and for angularly adjusting the panels relative to each other while they are rotating. For this purpose, each of the ring members 36-40 have ring gears formed on the inner ends thereof. As best shown in FIG. 3, the ring gears 56-60 are axially spaced apart with the ring gear 56 associated with the rear color panel 31 being disposed at the front of the stack and the ring gear 60 associated with the front color panel 135 disposed at the rear of the stack of ring gears. Each of the ring have gears have the same internal diameter and the same number of teeth. Individual planet gears 61-65 mesh with the ring gears 56-60, and, advantageously, a plurality of planet gears, for example, three such planet gears, are provided for each ring gear to radially center the ring gear and support the same. In order to aid in supporting the ring gears, each of the planet gears 61–65 are formed with spaced plates or flanges 66 and 67 which extend outwardly of the roots of the teeth on the planet gears and engage the relatively opposite sides of the ring gears to maintain the planet gears in meshing engagement with the respective ring gear and to also laterally support the ring gears.

The planetary gear drive also includes a sun gear. As shown, a plurality of separate sun gears 71–75 are provided and respectively mesh with the planet gears 61–65. The sun gears are concentric to the ring gears and are supported on an outer hub 76. In order to drive the ring gears, either the planet gears or the sun gears can be driven while the other is held relatively stationary, and the relatively stationary elements of the planetary gear can be angularly adjusted relative to each other to thereby angularly adjust the color panels connected to the associated ring gears. For reasons set forth hereinafter, it is advantageous to maintain the sun gears relatively stationary, and to drive the planetary gears. As best shown in FIG. 3, a stationary shaft 77 has one end thereof mounted on a support bracket 78. The shaft extends in cantilever fashion from the support bracket and has an inner hub 79 rotatably supported thereon, as by bearings 81 and 82. The inner hub 79 has a drive plate 83 attached to one end, and which drive plate underlies the inner color panel 31 to support the stack of panels at the inner side thereof. The drive plate is advantageously arranged to rotate in unison with the color panels and for this purpose has a peripheral rim portion 84 which is attached by fasteners 85 to the ring gear 56 at the front side of the stack of ring gears. The drive plate thus directly supports the ring member 41 both radially and axially, and also underlies the stack of color panels to support the inner side thereof. Each of the sets of planetary gears 61–65 are mounted on a common planet carrier 87, which carrier has a ring 88 thereon rotatably supported by a bearing 89 on the inner hub 79. The planet carrier is thus supported for rotation relative to the drive plate 83. Bearings 90 are interposed between the inner and outer hubs 79 and 76 to permit relative rotation between the inner and outer hubs. The planet gears 61–65 are mounted on drive pins 91–95 disposed at a circumferentially spaced points around the planet carrier 87. As will be noted from FIG. 5, the pins 91–95 have a progressively greater length, in accordance with the relative spacing between the planet carrier 87 and the several planet gears 61–65. The planet gears may be held in any suitable manner on the drive pins, and, as shown in FIG. 3, a screw-type fastener 96 is provided for this purpose.

The sun gears 71–75 are normally held stationary and are maintained in proper axially spaced relation by a flange 97 on one end of the outer hub 76, and by spacer washers 98 disposed between adjacent sun gears. As the front ring gear 56 is rotated by the drive plate 83 (counter-clockwise as viewed from the rear in FIG. 6 and indicated by the arrow R'), the planet gears 61 meshing therewith will move in orbital fashion around the relatively stationary sun gear 71. The planet carrier 87 is therefore driven through the front ring gear 56 and will rotate in the same direction as the ring gear 56 (indicated by arrow R'' in FIG. 6) but at a speed somewhat lower than the ring gear. The other planet gears 62–65 are connected to the planet carrier 87 and rotate therewith to drive the other ring gears 57–60 in unison with the ring gear 56. This arrangement wherein the planet carrier is driven, instead of the sun gears, is advantageous in that it markedly reduces the speed at which the planet gears rotate on the respective pins 91–95, for any selected speed of the ring gears, and therefore reduces wear and noise.

Angular adjustment of the sun gears 71–75 relative to each other, to effect angular adjustment of the respective color panels 31–35, is conveniently effected by means of a plurality of pulley disks 101–105 respectively. The pulley disks are disposed concentric to the sun gears and spaced axially therefrom and, as best shown in FIG. 3, are supported on the outer hub 76 for limited turning relative thereto. Suitable spacer rings 106 are disposed between adjacent pulley disks to maintain the latter in proper spaced relation and a retaining ring 107 is attached to the outer hub at the rear side of the stack of pulley disks.

In accordance with the present invention, provision is made for connecting individual ones of the sun gears 71–75 to respective ones of the axially aligned pulley disks 101–105 for rotation therewith, without necessitating a plurality of concentric shafts. For this purpose, each sun gear 71–75 is connected to a respective one of the pulley disks 101–105 through control pins 111–115 respectively spaced radially outwardly from the axis of the gun gears and pulley disks. As best shown in FIG. 5, each of the sun gears 71–75 have an arcuate slot 116–120 formed therein, and which slot is concentric with the sun gear axis. The pins 111–115 are rigidly secured to the respective sun gears 71–75 adjacent one end of the slot therein and the pins project rearwardly through the slots in the other sun gears. The other ends of the pins 111–115 are secured respectively to the pulley disks 101–105 and, as shown, the pins have reduced portions on the rear ends thereof which extend through openings 121–125 in the pulley disks. Fasteners such as the screws 110 (FIG. 6) are provided for securing the pulley disks to the ends of the pins. The pulley disks 101–105 also have arcuate slots 126–130 therein, and which slots have the same radius as the slots in the sun gear. With the arrangement illustrated wherein the front sun gear is connected to the front pulley disk, etc., the slots in the pulley disks are arranged to extend in a relatively opposite direction from the point of attachment of the pin thereto. Thus, as shown in FIG. 5, the slots 116–120 in the sun gears extend in a counter-clockwise direction from the respective pins, and the slots 126–130 in the pulley disks extend in a clockwise direction from the point of attachment of the respective pins. The pulley disks are conveniently angularly adjusted by means of a pulley ring 131–135 attached to the rear side of the respective disks 101–105 through a cable-type drive to be described hereinafter.

Figure 2:
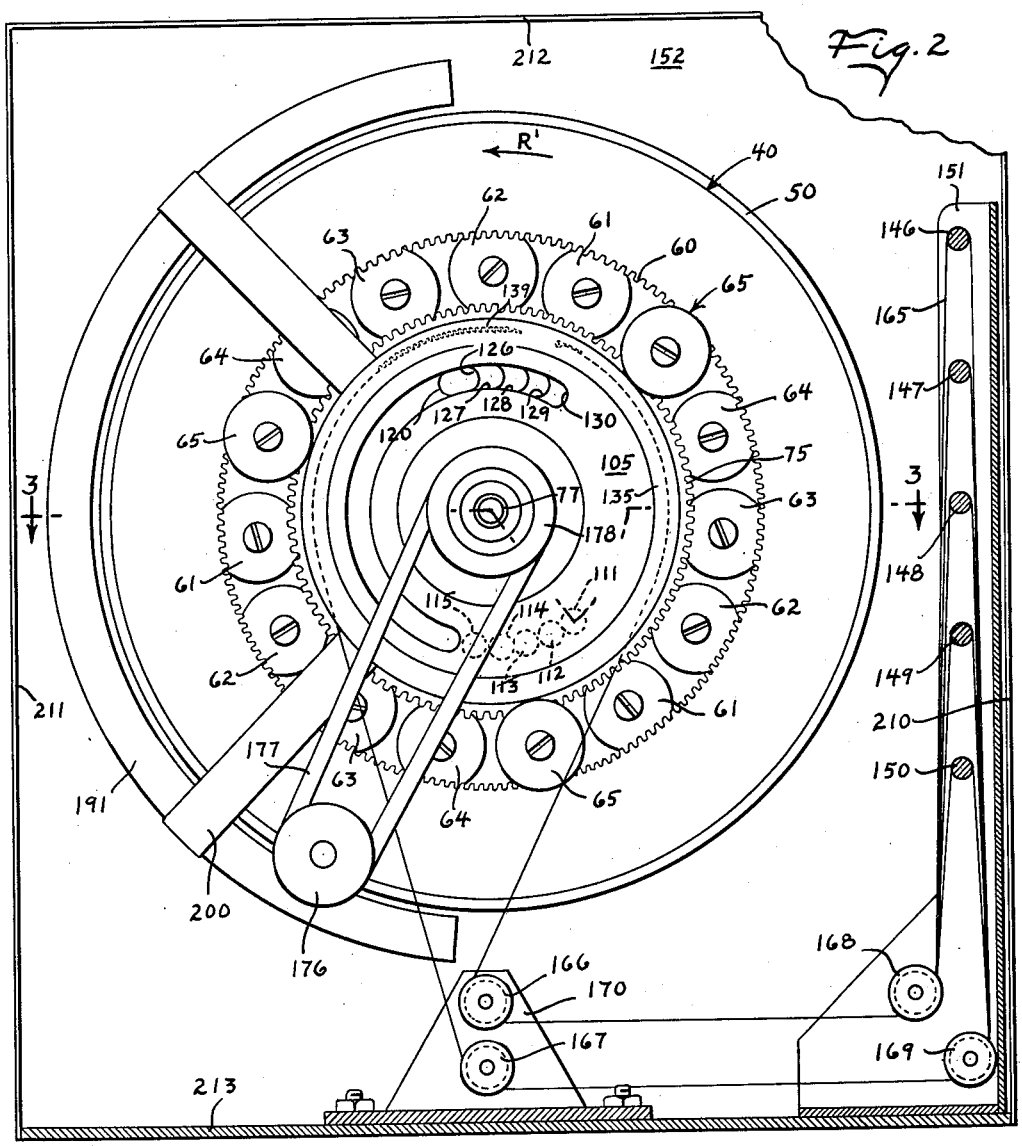
FIG. 2 is a transverse vertical sectional view taken on the plane 2—2 of FIG. 3 and illustrating the rear side of the device.
Figure 1:
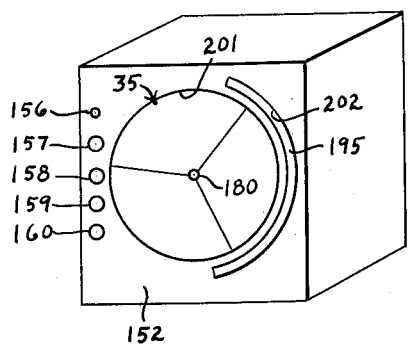
FIG. 1 is a perspective view of the color display device.

Individual control shafts 146–150 are provided for turning the pulley disks 101–105 to adjust the color panels relative to each other. In the embodiment illustrated, the pulley shafts are mounted in an upright generally channel-shaped bracket 151 disposed adjacent one side of the machine. The shafts extend through the front wall 152 of the machine and have control knobs 156–160 on the outer ends thereof. For reasons which will become apparent as the following description proceeds, the control cables 161–165 extend over grooved idler pulleys 166, 167, 168 and 169. The idler pulleys 168 and 169 are mounted adjacent the lower end of the bracket 151 and the idler pulleys 166 and 167 are mounted in a bracket 170 disposed below the shaft 77. The control cables 161–165 are terminally attached to a respective one of the pulley rings 131–135. As best shown in FIG. 2 each of the cables extends from the pulley over a first idler wheel 166, then over a second idler wheel 168 and is looped around a respective one of the shafts 146–150 several times and then passes down over idler wheel 169 and idler wheel 167 and back to the pulley. A spring-type slack take up device 139 (see FIG. 2) is provided between one end of the cable and the respective pulley disk to accommodate variations in length of the cable and to maintain the latter in a taut condition. Thus, the individual control knobs 156–160 can be turned to individually adjust the color panels relative to each other. A drive motor 175 is mounted in any suitable manner, as on the bracket 78, and has a drive pulley 176 connected through a belt 177 to a pulley 178 on the inner hub 79. A cap-nut 180 is preferably threaded onto the end of the shaft 77 and engages the front face of the stack of color panels to retain the radially inner ends of the sectors against lateral displacement. Advantageously, a bearing 181 is disposed around the outer end of the shaft 77 between the cap-nut and the drive plate 83 to rotatably support the color panels on the shaft.

Figure 6:
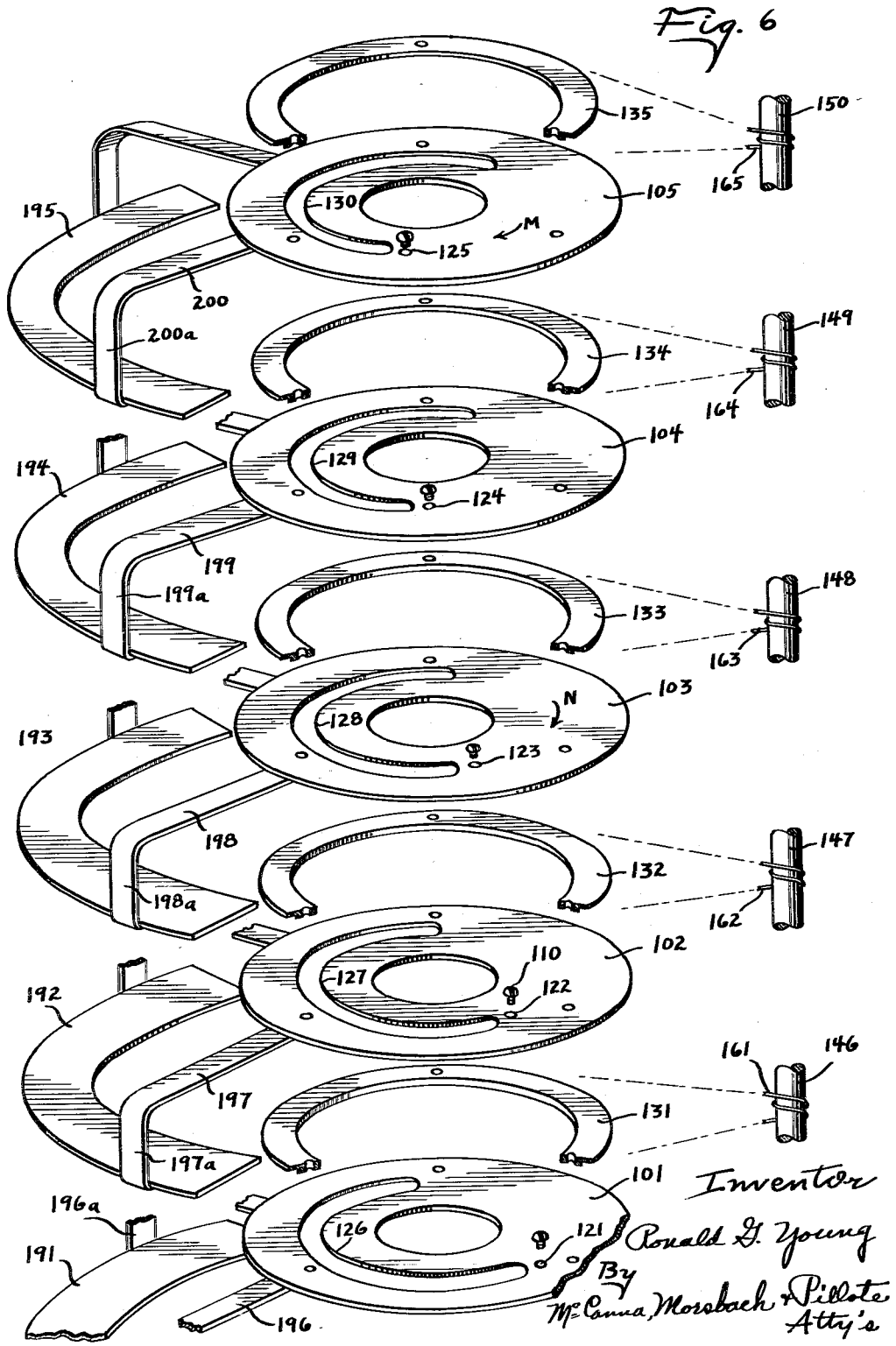

An indicator mechanism is provided for indicating the relative positions of the several color panels while they are rotating. The indicator mechanism is advantageously connected to the normally stationary sun gears for movement therewith. As best shown in FIG. 6, the indicator means comprises a plurality of arcuate indicator sectors or panels 191–195 which are respectively connected through arms 196–200 to the pulley disks 101–105 for movement therewith. The indicator panels 191–195 are disposed concentric to the ring gears and are spaced radially outwardly therefrom. The arms have portions which are attached to the respective pulley disks, and which portions are axially spaced apart and which merge with portions designated 196a–200a disposed in radially overlapping relation. The portions 196a–200a are connected to the respective indicator panels 191–195. Thus, the indicator sectors 191–195 are connected through the planetary gearing to the color panels 31–35. The indicator panels move relative to each other in accordance with the relative movement of the color panels, but the indicator panels do not rotate as the color panels are rotated. Because of the relatively different diameters of the ring and sun gears, the sun gears and hence the indicator sectors must turn through a somewhat greater angle than the ring gears and color panels, in order to adjust the latter through the full 120°. In the embodiment illustrated, the sun gears and color sectors must be turned through approximately 160° in order to turn the ring gear and color panels through 120°. The indicator panels are accordingly constructed so as to have an arcuate extent correlative with the angular movement of the sun gears during adjustment of the color panels and, as shown in FIGS. 7 and 8, have an arcuate extent of at least 160°. As shown in FIG. 3, the front wall 152 of the housing is provided with a circular view opening 201 having a diameter substantially equal to the diameter of the color panels, and a crescent shaped opening 202 having an arcuate extent substantially equal to the angular movement of the indicator sectors 191–195.

The rear indicator panel 191 is adjusted so as to register with the indicator opening 202, and is then locked in position by any suitable means. In order to enable zero adjustment of the rear indicator panel 191 from the front of the machine, the knob 156 for turning the shaft 146 associated with the pulley disk 101 is advantageously in the form of a slotted head on the front end of the shaft, as shown in FIGS. 7 and 8, to enable adjustment of the rear indicator panel with a screw-driver. A lock nut 182 (see FIGS. 7 and 8) is threaded on the shaft 146 and arranged to engage the bracket 151 to lock the shaft 146 in adjusted position. The forward indicator panels 192–195 are arranged to overlap the rear indicator panel 191, when the color panels 31–35 are arranged in the position shown in FIG. 7 with the color panels 31–34 disposed behind the outer color panel 35. In the embodiment illustrated, the rear indicator panel 191 is connected to the rear color panel 31 so that, during angular adjustment of the color panels, the forward color panels 32, 33, 34 and 35 are moved in a direction to uncover the rear color panel 31. Alternatively, the rear indicator panel 191 could be operatively connected to the front color panel 35, if desired. For example, the pins 111–115 which connect the sun gears 71–75 to the pulley disks 101–105 respectively could be arranged to connect the sun gears 71–75 to the pulley disks 105–101 respectively. With that arrangement, the rear indicator panel would be connected to the front color panel and the rear color panels would then be adjustable relative to the front color panel.

In the embodiment disclosed wherein the color panels are rotated in a clockwise direction as viewed in FIGS. 7 and 8, the color panels 32–35 are each movable in a clockwise direction relative to the color panel immediately rearwardly thereof, and relative to the rear color panel 31, to uncover selectively variable portions of the rear color panels. In order to move the ring gears and color panels in a clockwise direction relative to each other, it is necessary to turn the sun gears and hence the pulleys in a counter-clockwise direction as viewed from the front. Therefore, when one of the color panels such as 35 is turned relative to the other panels in a clockwise direction, to expose portions of the rear color panels, the indicator panels 195 associated therewith will turn in a relatively opposite or counterclockwise direction and through an angle correlative with but somewhat greater than the angle of adjustment of the color panels. As previously noted, the sun gears 72–75 in the embodiment shown must be turned through an angle of about 160° relative to sun gears 71 to turn the color panels 32–35 through 120° relative to panel 31. However, the length of the arcuate slots 117–120 and 126–129 must be somewhat greater than 160° since the pins 111–115 extend through the slots and occupy some of the space in the slots. In the particular embodiment shown, each pin occupies about 10° of arc in the slots. Since one pin extends through slots 117 and 129; two pins through slots 118 and 128; three pins through slots 119 and 127; and four pins through slots 120 and 126, it is necessary to respectively dimension these slots at least 170°; 180°; 190°; and 200°. However, for simplicity of manufacture, all slots can be made the same as that required for slot 120 which, as described above, is 200°. Thus, as viewed from the rear in FIGS. 5 and 6, the clockwise ends of the slots 117–120 in sun gears 72–75 respectively engage pins 111–114 to limit counter-clockwise movement of the sun gears 72–75 relative to the sun gears 71. When in this position, the slots in sun gears 72–75 are angularly offset 10° in a counter-clockwise direction from the slots in the next forward sun gear 71, and, similarly the slots 127–130 are angularly offset 10° in a clockwise direction from the slot in the next forward pulley disk. Thus, pin 115 on sun gear 75 is angularly advanced 40° in a clockwise direction from the pin 111 connected to pulley disk 101, when the sun gear 75 is in its full counter-clockwise position shown in FIG. 5. Pin 115 on sun gear 75 will therefore engage the clockwise end of the slot 126 in the fixed pulley disk 101, when the sun gear 75 is turned clockwise 160° from the position shown in FIG. 5. The pins 114–112 on the intermediate sun gears will engage the clockwise ends of slots 120–118 when sun gears 74–72 are turned clockwise relative to sun gear 75 and, therefore, the intermediate sun gears cannot be turned clockwise from the position shown in FIG. 5 through an angle greater than the angle through which the sun gear 75 is turned. In this manner, movement of the color panels out of interleaved relation is positively prevented.

For purposes of describing the operation of the device, it is assumed that the color panels are in the position shown in FIG. 7 with the panels 34, 33, 32 and 31 disposed behind the front panel 35 so as to expose the single color on the front panel. The indicator panels 195, 194, 193 and 192 are then in the position shown in FIG. 7 overlying the rear indicator panel 191. The indicator panels are each graduated and, as shown in FIG. 2, are preferably divided into 100 equal segments indicating that 100% of the front color panel 35 is exposed. If it is desired to remove some of the color on the front color panel 35 and expose all or a portion of the next adjacent color panel 34, the knob 160 is rotated to turn the pulley disk 105 in a counter-clockwise direction as viewed from the front of the machine, and in a clockwise direction as viewed from the rear and indicated by the arrow M in FIG. 6. The pin 115 which is attached to the pulley disk 105 extends through the slots 129, 128, 127 and 126 in the other pulley disks, and is connected to the sun gear 75 to turn the same in a clockwise direction as viewed in FIG. 5, and as indicated by the arrow M'. The slots 129–126 thus allow the pin 115 to turn relative thereto without causing corresponding turning of the other disks. The indicator panel 195 attached to the pulley disk 105 moves therewith and uncovers the next adjacent indicator panel 194 by an amount proportional to the relative movement of the color panels. On the other hand, if it is desired to adjust the forward color panels 35, 34 and 33 to expose a portion of the next adjacent color panel 32, it is only necessary to turn the knob 158 to turn the pulley disk 103 associated therewith in a clockwise direction as viewed from the rear, and as indicated by the arrow N in FIG. 6. The pin 112 attached to the pulley disk 103 extends through the slots 127 and 126 in the disks 102 and 101 and also extends through the slots 120 and 119 in the sun gears 75 and 74. As the pulley disk 103 is turned in a clockwise direction as viewed from the rear, the slots 126 and 127 permit the pin to turn relative thereto without causing corresponding turning of the pulley disks 101 and 102. However, the pin 113 when turned in a clockwise direction (viewed from the rear), engages the end of the slot 119 in the adjacent sun gear 74 and therefore turns that sun gear with the sun gear 73. Similarly pin 114 on the sun gear 74 extends through the slot 120 in the sun gear 75 and engages the end of the slot to turn the sun gear 75 clockwise with the sun gear 74. In this manner, clockwise adjustment of the pulley disk 103 will simultaneously adjust sun gear 73, as well as sun gear 74 and 75 to move the color panels 33–35 in unison.

In FIG. 8, the color panels are illustrated with each of the panels angularly adjusted relative to the adjacent panels. As shown, the sectors designated 31a, 31b and 31c are rearmost colored sectors and the other sectors of the other panels 32–35 are angularly adjusted relative thereto. Movement of the color panels relative to each other to the position shown in FIG. 8 is best accomplished by first adjusting the color panel 32 next to the rear color panel through the desired angle, herein shown as 15°. Adjustment of the color panel 32 simultaneously moves all of the forward color panels 33, 34 and 35 through a similar angle to expose the desired amount of color on panel 31. Panel 33 is then adjusted relative to panel 32 through the desired angle, herein shown as 30° and the forward panels 34 and 35 are simultaneously adjusted through this further angle with the panel 33. Thereafater the panel 34 is adjusted through an additional angle relative to the panel 33, and moves the panel 35 therewith and lastly, the panel 35 is adjusted relative to the panel 34 to uncover the desired amount of the color on panel 34. The indicator panels 192–195 move through an angle correlative with the angular movement of the respective color panel, but in a relatively opposite direction, to expose corresponding portions of the indicator panels in the indicator opening 202. Because of the gear ratio in the planetary system, the indicator panels move through a relatively greater arc. As previously noted, the indicator panels are marked so as to directly indicate the percentages of the various colors exposed. As shown, 12½% of indicator panel 191; 25% of each of the indicator panels 192, 193 and 194, and 12½% of the indicator panel 195 is exposed. The indicator panels thus directly indicate the percentage composition of the colors. Obviously, any other suitable graduation system may be employed, if desired.

The display apparatus is preferably enclosed in a casing and as shown, spaced side walls 210, 211 and top and bottom walls 212 and 213 are attached to the front wall 152.

In practice, it has been found that the torque applied to the sun gears due to rotation of the ring gears and planet gears does not overcome the friction in the mounting of the sun gears 71–75, the pulley disks 101–105 and in the cable and shaft apparatus 146–150 for adjusting the pulley disks relative to each other, and that the sun gears do not tend to turn or drift during rotation of the ring gears. It has also been found that turning of one sun gear and color disk through its respective knob 156–160, while the color disks are rotating, does not cause spurious turning of the other color disks until the pins 111–115 engage the ends of the slots in adjacent disks. Accordingly, it has not been found necessary to provide a separate brake apparatus on the control shaft 146–150 to prevent spurious turning. If desired, or if additional locking action is found necessary, any suitable friction brake or the like can be provided on the shafts 146–150 to prevent spurious turning of the same.

In the embodiment shown in FIGS. 1–8, the tabs 51–55 on the color panels are rigidly secured as by soldering to the respective ring members 36–40. A modified arrangement for attaching the color panels is illustrated in FIGS. 9–14. In this embodiment, the sectors designated 231–235 of the various color panels are formed with tabs 251–255 thereon. Each of the sectors of the color panels has a central ring portion 241–245 thereon and which ring portions are adapted to receive the central locating pin or shaft 77' to radially center the sectors. The sectors are each notched adjacent the juncture of the ring with the body of the panel to provide a thin connector designated 246–250, which connects the ring portions to the body of the respective sectors. The connectors 246–250 have an angular width no greater than the angular width of the respective tabs 251–255 and are advantageously oriented in the same relative position as the respective tabs. As best shown in FIG. 14, the ring portions such as 241 of each set of sectors are stacked upon each other to receive the central pin, and the tabs 251–255 have hook portions 256 at their outer ends adapted to engage the flanges on the respective ring-shaped carrier. Advantageously, each of the carriers such as 257 are formed with peripheral notches designated 258 for receiving the hook portions on the tabs, to prevent turning movement between the sectors and the respective carrier. The color panels of the several sets are interleaved in the same manner as previously described, with the central ring portion on each set of sectors grouped together and stacked upon the hub portions of the adjacent set of sectors. When arranged in this manner, the notches formed between the ring portions and the body of the sectors provide clearance for the connectors designated 246–250 of the other color panels during angular adjustment of the color panels.

A further modified arrangement for attaching the sectors of the different color panels to the respective ring carriers is shown in FIGS. 17–20. In this embodiment, the sectors designated generally by the number 260 are formed with outwardly extending tabs 261, which tabs advantageously have an angular width corresponding to that described in connection with the embodiment of FIGS. 1–8. In addition, as shown in FIG. 18, the tabs on the different color panels, designated 261a–261e extend progressively greater distances from the center of the color panels for attachment to the concentric ring members. In this embodiment, each sector has a ring portion designated 262 thereon and which ring portion has a generally radially extending slit 263 advantageously located along a line substantially bisecting the sector. Outwardly, extending ears 264 are provided on the outer ends of the tabs 261 and are preferably offset slightly as shown in FIG. 20 for reception into corresponding openings 265 in the flange portion of the ring carriers, designated generally by 269. In this embodiment, the ring portions designated 260a–260c in FIG. 19 of the sectors of each set are spirally interleaved as shown in that figure. Spiral interleaving of the ring portions 262 on the sectors of all panels can be most easily achieved by first interleaving the sectors on the rear panel in the manner generally shown in FIG. 19. One color sector of the next adjacent panel is then positioned to overlie one sector such as 260a so that the slit in the added sector registers with the slit 263 in sector 260a. One edge of the ring portion of the added sector is inserted below the exposed portion of the ring 262a and the added sector is then turned in a clockwise direction as viewed in FIG. 19 through about 240° until the slit in the added sector is substantially aligned with the slit in the ring portion 262c of sector 260c. The ears 264 on the added sector are then inserted through the openings 265 in the respective carrier to lock the sector in position. Succeeding sectors are added in a similar fashion until the entire stack is assembled. When assembled in this manner, the edges of the sectors of the different panels will overlap in the manner described in FIGS. 1–8 and as shown in FIGS. 15 and 16. This arrangement enables relative angular adjustment of the several color panels while defining a central opening for receiving the locating pin such as 180.

The planet gears 61 rotate at a relative high speed and it is advantageous to reduce the friction and noise caused thereby. As shown in FIGS. 21 and 22, the planet gears 61' are rotatably supported on their respective pin 91' by an anti-friction bearing 275. The gear 276 is advantageously formed of a relatively soft material such as plastic or buterene rubber. As shown in FIG. 22, the gear has teeth 277 formed on its periphery and an integral flange 278 at one side of the gear teeth which extends out to the tips of the teeth to circumferentially support the same. Support plates 279 and 280 are mounted at opposite sides of the gear to support the same on the anti-friction bearing 275. The support plate 279 is advantageously formed with toothed recesses in the interface thereof for receiving the ends of the teeth 277 to aid in radially and circumferentially supporting the same. The plates 279 and 280 extend outwardly a short distance beyond the periphery of the teeth for engaging the sun and ring gears to laterally support the planetary gears thereon. The plates 279 and 280 may conveniently be formed of a plastic material which is somewhat more rigid than the material which forms the planetary gear 276, and the plates are held in assembled relation by integral pins 282 which extend from the plate such as 279 through openings in the plate 280. The pins 282 are secured to the plate 280 by a suitable adhesive or, as shown, by heat welding the same thereto.

The several color panels of the display device are therefore angularly adjustable relative to each other to expose selectively variable portions of the several different color panels at the front side of the stack. Since each color panel has an arcuate extent of 360°, the panels can be adjusted relative to each other to completely expose any selected one of the color panels or, alternatively, to expose selectively variable portions of the different color panels to intermix the several colors. In the five color panel devices illustrated, it is preferable to color the outer panel 35 white, the next panel 34 black, and to apply the so-called primary colors such as red, yellow and blue to the other color panels 33–31. With this arrangement it is possible to display the primary hues with the maximum brilliance of the colors on the panels 33–31 and to mix the primary hues to obtain other hues. The white and black panels can be adjusted to modify the brightness and value of the different hues. Since the indicator panels are movable through an angle correlative with the relative positions of the color panels, the indicator panels at all times indicate the relative composition of the color being displayed by the rotating panels.

I claim:

1. A color simulating apparatus comprising a selectively changeable color display screen, said screen including a stack of overlaying color panels having one side of the stack exposed to provide a display area, each color panel having a different color on the face thereof and having a plurality of similar size segments, means connecting the several segments of each panel together in fixed relative relation and with relatively opposite edges of each segment respectively overlapping and underlapping the edges of adjacent segments to form a continuous surface, the segments of the several color panels being interleaved with each other to enable movement of the segments of any selected one of the panels wholly or partially to said one side of the stack when the color panels are moved relative to each other, means for selectively moving the several color panels relative to each other to expose selectively variable portions of the different color panels, and means for turning the several color panels in unison to optically mix the exposed portions of the color panels.

2. A color simulating apparatus comprising a selectively changeable color display screen, said screen including a stack of color disks having one side of the stack exposed to provide a color display area, each color disk having a different color on the face thereof and having a plurality of similar size sectors, the total angular width of which is at least 360 degrees, means connecting the several sectors of each disk together in fixed relative angular relation to form a continuous color surface, the sectors of the several color disks being interleaved with each other to enable movement of the sectors of any selected one of the disks wholly or partially to said one side of the stack when the color disks are turned relative to each other, means for selectively turning the disks relative to each other to expose selectively variable portions of the different color disks, and means for rotating the several color disks in unison to optically mix the exposed portions of the color disks.

3. A color simulating machine comprising a selectively changeable color display screen, said screen including a stack of color disks having one side of the stack exposed to provide a display area, said color disks each having a different color on the face thereof and having a plurality of substantially equal arcuate sectors, the total angular width of which is at least 360 degrees, a plurality of annular carriers each individual to one of the disks, means attaching the sectors of each disk adjacent the radially outer edge thereof to a respective one of the carriers to support the sectors of each disk in fixed relative angular relation and define a continuous color surface, the sectors of the several color disks being interleaved with each other to enable movement of the sectors of any selected one of the color disks to said one side of the stack when the color disks are turned relative to each other, means for selectively turning the several carriers relative to each other to expose selectively variable portions of the several color disks, and means for rotating the several carriers in unison to optically mix the exposed portions of the color disks.

4. A color simulating machine comprising a selectively changeable color screen, said screen including a stack of color disks having one side of the stack exposed to provide a display area, said color disks each having a different color on the face thereof and having a plurality of substantially equal overlapping arcuate sectors, the total angular width of which is greater than 360 degrees, a plurality of annular carriers each individual to one of the disks, means attaching the sectors of each disk adjacent the radially outer edge thereof to a respective one of the carriers with relatively opposite edges of each sector respectively overlapping and underlapping the edge of adjacent sectors to define a continuous color surface, the sectors of the several color disks being interleaved with each other to enable movement of the sectors of any selected one of the disks wholly or partially to said one side of the stack when the color disks are turned relative to each other, drive means for rotating said carriers, and means operatively connected to the drive means for selectively turning the carriers relative to each other to expose selectively adjustable portions of the several color disks while the disks are rotating.

5. A color simulation apparatus comprising a selectively changeable color display screen, said screen includes a stack of color disks having one side of the stack exposed to provide a display area, and color disks each having a different color on its face and being mounted for rotation about a common axis transverse thereto, each color disk including a plurality of substantially equal arcuate sectors, a ring member individual to each disk, a tab on the outer edge of each of the sectors having an angular width no greater than $$\frac{360}{n}$$

where $n$ is the total number of sectors in all of the disks, means connecting the tabs on the sectors of each disk to a respective ring member at circumferentially spaced points therearound to support the sectors of each disk in fixed relation to each other, drive means operatively connected to said ring members for rotating the same in unison, and adjustable means in said drive means for turning selected ones of the ring members relative to each other while the ring members are rotating, the sectors of the several disks being interleaved to expose selectively variable portions of the different sectors at the outer end of the stack when the color disks are turned relative to each other.

6. A color simulating machine comprising a selectively changeable color display screen, said screen including a stack of color panels mounted for turning and for limited movement relative to each other, means for turning said panels in unison and for adjusting the panels relative to each other while they are turning, said means including an epicyclic gear mechanism having a set of carrier gear members each connected to a respective one of the panels; a set of normally stationary gear members; and a drive gear means, and means for adjusting the normally stationary gear members relative to each other angularly adjusting the color panels relative to each other.

7. The combination of claim 6 including indicator means operatively connected to said normally stationary gear members for movement correlative with the movement of the stationary gear members to indicate the relative positions of said panels.

8. A color simulating machine comprising a color display screen, said screen including a stack of color panels mounted for turning and for limited movement relative to each other, means for turning said panels in unison and for adjusting the panels relative each other while they are turning to produce different color effects, said means including a differential-type gear mechanism having first, second and third gear means, two of said gear means being mounted for turning movement about a common axis and the other of said gear means meshing with each of said two gear means and being mounted for planetary movement about said common axis, said first gear means having a plurality of first gear members each connected to a respective one of said color panels, said second gear means including a plurality of second gear members, means operatively connected to said second gear members for holding the same against movement about said common axis and for selectively angularly adjusting the same relative to each other, and drive means operatively connected to said third gear means for rotating all of said panels.

9. A color simulating machine comprising a selectively changeable color display screen, said screen including a plurality of color panels mounted for rotation and for limited turning relative to each other, means for rotating said panels in unison and for angularly adjusting the panels relative each other while they are rotating to produce different color effects, said means including a differential-type gear mechanism having first, second and third gear means, two of said gear means being mounted for turning movement about a common axis and the other of said gear means meshing with each of said two gear means and being mounted for planetary movement about said common axis, said first gear means having a plurality of first gear members each connected to a respective one of said color panels, said second gear means including a plurality of second gear members, means operatively connected to said second gear members for holding the same against movement about said common axis and for selectively angularly adjusting the same relative to each other, drive means operatively connected to said third gear means for rotating all of said panels, and indicator means operatively connected to said second gear means for movement correlative with the angular movement thereof to indicate the relative angular position of said color panels.

10. A color simulating machine comprising a selectively changeable color display screen, said screen including a stack of color panels mounted for rotation and for limited turning relative to each other, means for rotating said panels in unison and for angularly adjusting the panels relative each other while they are rotating to produce different color effects, said means including a planetary-type gear mechanism having first, second and third gear means, two of said gear means being mounted for turning movement about a common axis and the other of said gear means meshing with each of said two gear means and being mounted for planetary movement about said common axis, said first gear means having a plurality of first gear members each connetced to a respective one of said color panels, said second gear means including a plurality of second gear members, means operatively connected to said second gear members for holding the same against movement about said common axis and for selectively angularly adjusting the same relative to each other, drive means operatively connected to said third gear means for rotating all of said panels, and a plurality of indicator panels each operatively connected to a respective one of said second gear members for movement correlative with the angular movement thereof, said indicator panels being disposed in overlapping relation whereby the exposed area of the indicator panels is correlative with the angular position of the color panels.

11. A color simulating apparatus comprising a selectively changeable color display screen, said screen including a stack of color panels having an outer panel at one side of the stack and a plurality of inner color panels normally disposed behind the outer panel and each having a different color on the face thereof, each color panel having a plurality of substantially equal arcuate segments, the total angular width of which is greater than 360 degrees, means connecting the several arcuate segments of each member together in fixed angular relation and with one edge of each segment of each color panel overlapping a portion of the outer face of an adjacent segment of that panel, the segments of the inner color panels having one edge portion thereof interposed between the overlapping portions of the segments of the outer panel, means for rotating the several color panels in unison and for angularly adjusting said panels relative to each other while they are rotating to expose selectively variable portions of the different color panels, said last mentioned means including a differential-type gear mechanism.

12. A color simulating apparatus comprising a selectively changeable color display screen, said screen including a stack of panels having an outer panel at one end of the stack and a plurality of inner color panels normally positioned behind the outer panel and each having a different color on the face thereof, each color panel having a plurality of substantially equal arcuate segments, the total angular width of which is greater than 360 degrees, means connecting the several arcuate segments of each member together in fixed angular relation and with one edge of each segment of each color panel overlapping a portion of the outer face of an adjacent segment of that panel, the segments of the inner color panels having one edge portion thereof interposed between the overlapping portions of the segments of the outer panel means for rotating the several color panels in unison and for angularly adjusting said panels relative to each other while they are rotating to expose selectively variable portions of the different color panels, said last mentioned means including a differential-type gear mechanism having a first set of gear members each connected to a different one of said color panels; a drive gear means; a set of normally stationary gear members, and selectively operable means for effecting angular adjustment of the normally stationary gear members.

13. The combination of claim 12 including a plurality of indicator means each operatively connected to one of said normally stationary gear means for movement correlative with the angular movement of the respective normally stationary gear means to indicate the relative angular position of the different color panels.

14. A color simulating apparatus comprising a selectively changeable color display screen, said screen including a stack of generally circular color disks having generally radially extending edge portions disposed in overlapping relation to enable selectively variable portions of the different disks to be exposed at the front of the stack when the disks are turned relative to each other, a plurality of axially spaced ring gears disposed behind the stack and having means connecting each ring gear to a respective one of the disks adjacent the outer periphery of the latter, at least one planet gear individual to each ring gear and meshing therewith, a planet gear carrier supporting the planet gears for orbital movement about the axis of the ring gears, and a plurality of sun gears disposed internally of the ring gears and meshing with said planet gears, drive means operatively connected to said planet carrier for moving said planet gears in an orbital path around the sun gears, and means operatively connected to said sun gears for selectively angularly adjusting the same relative to each other to turn the color disks relative to each other.

15. The combination of claim 14 wherein said drive means includes a drive plate underlying the rear side of said stack, to support the same, and means connecting said drive plate to one of said ring gears whereby to drive said planet carrier through one of said planet gears.

16. A color simulating apparatus comprising a selectively changeable color display screen, said screen including a stack of generally circular color disks having generally radially extending edge portions disposed in overlapping relation to enable selectively variable portions of the different disks to be exposed at the front of the stack when the disks are turned relative to each other, a plurality of axially spaced ring gears disposed behind the stack and having means connecting each ring gear to a respective one of the disks adjacent the outer periphery of the latter, at least one planet gear individual to each ring gear and meshing therewith, a planet gear carrier supporting the planet gears for orbital movement about the axis of the ring gears, and a plurality of axially spaced sun gears disposed internally of the ring gears and meshing with said planet gears, drive means operatively connected to said planet carrier for moving said planet gears in an orbital path around the sun gars, a plurality of control members mounted for turning movement about the axis of said sun gears and spaced axially therefrom, means connecting each sun gear to a respective one of said control members for turning therewith, and means for angularly adjusting said control members relative to each other to vary the exposed portions of the different disks.

17. The combination of claim 16 including indicator means operatively connected to said control members to indicate the relative positions of said color disks.

18. The combination of claim 16 including a plurality of arcuate color segments disposed coaxial with said color disks and spaced radially outwardly therefrom, and means connecting each color segment to a respective one of said control members for movement therewith whereby the relative positions of said color segments are correlative with the relative positions of said color disks.

19. A color simulating apparatus comprising a selectively changeable color display screen, said screen including a stack of generally circular color disks having generally radially extending edge portions disposed in overlapping relation to enable selectively variable portions of the different disks to be exposed at the front of the stack when the disks are turned relative to each other, a plurality of axially spaced ring gears disposed behind the stack and having means connecting each ring gear to a respective one of the disks adjacent the outer periphery of the latter, a set of planet gears including at least one planet gear individual to each ring gear and meshing therewith, a planet carrier means supporting the planet gears for orbital movement about the axis of the ring gears, a set of sun gear members including a gear member individual to each ring gear and meshing with a respective one of the planet gears, drive means operatively connected to one of said sets of gears for rotating said ring gears, and means connected to said other gear set for angularly adjusting the gear members thereof relative to each other to thereby angularly adjust the ring gears and color disks relative to each other.

20. The combination of claim 19 wherein said planet gears each include a toothed gear element and axially spaced guide means extending outwardly of the roots of the teeth of the gear element and engaging opposite sides of respective ones of the sun and ring gears to guide and support the same.

21. The combination of claim 20 wherein said planet gears are formed of resilient material and said guide means engage and circumferentially support the ends of the teeth on the planetary gears.

22. A color simulating apparatus comprising a selectively changeable color display screen, said screen including a stack of generally circular color disks having generally radially extending edge portions disposed in overlapping relation to enable selectively variable portions of the different disks to be exposed at the front of the stack when the disks are turned relative to each other, a plurality of axially spaced ring gears disposed behind the stack and having means connecting each ring gear to a respective one of the disks adjacent the outer periphery of the latter, a set of planet gears including at least one planet gear individual to each ring gear and meshing therewith, a planet carrier means supporting the planet gears for orbital movement about the axis of the ring gears, a set of sun gear members including a gear member individual to each ring gear and meshing with a respective one of the planet gears, drive means operatively connected to one of said sets of gears for rotating said ring gears, plurality of control members mounted for turning about the axis of the ring gears, means including pins extending parallel to the axis of said ring gears connecting each gear member of the other of said sets to a respective one of said control members for turning movement therewith, and means connected to said control members for angularly adjusting the same to thereby angularly adjust the ring gears and color disks relative to each other.

23. A color simulating apparatus comprising a selectively changeable color display screen, said screen including a stack of generally circular color disks, said disks each including a plurality of sectors having generally radially extending edge portions, a plurality of annular carriers each individual to one of the disks, said sectors of each disk having an eye portion at the inner end thereof, means extending through the eye portions of the sectors of the several disks to radially position the same, means on the outer edge of each sector attaching the same to a respective one of the carriers, and drive means for rotating the carriers in unison and for selectively angularly adjusting the carriers relative to each other to expose selectively variable portions of the different color disks at the front of the stack.

24. A color simulating apparatus comprising a selectively changeable color display screen, said screen including a stack of generally circular color disks, said disks each including a plurality of sectors having generally radially extending edge portions, a plurality of annular carriers each individual to one of the disks, said sectors of each disk having an eye portion at the inner end thereof, means extending through the eye portions of the sectors of the several disks to radially position the same, each sector having an outwardly extending tab on the periphery thereof with each tab having an angular width no greater than $$\frac{360°}{n}$$

where $n$ is the total number of sectors in all of the color disks, means detachably securing said tabs to a respective one of said carriers, and drive means for rotating said carriers, in unison and for selectively angularly adjusting said carriers relative to each other to expose selectively variable portions of different color disks at the front of the stack.

25. The combination of claim 24 wherein said eye portions are connected to the respective sector throughout substantially the entire angular width of the respective sector, said eye portions having a cross slot therein and being disposed in spiral overlapping relation with the eye portions of the other sectors.

26. The combination of claim 24 wherein said eye portions are spaced radially inwardly of the respective sector and are connected thereto through a reduced neck portion having an angular width correlative with the tab portions on the respective sector.

27. In a color display apparatus, a stack of color panels mounted for turning and limited angular adjustment relative to each other, adjustable drive means for turning and for selectively angularly adjusting said panels relative to each other, said drive means including a first stack of axially aligned elements and a second stack of axially aligned elements, means supporting said first and second stacks of elements for turning about a common axis, a plurality of connector pins each attached to different elements of the first stack and to a respective one of the elements of the second stack to provide interconnected pairs of elements, said pins being spaced radially from the axis of the elements a similar distance, the elements of said first and second stacks intermediate front element on said first stack and rearmost element on said second stack having arcuate slots therein for receiving said pins to enable limited relative angular movement of each pair of interconnected elements relative to other pairs of interconnected elements.

28. In a color display apparatus, a stack of color panels mounted for turning and limited angular adjustment relative to each other, adjustable drive means for turning and for selectively angularly adjusting said panels relative to each other, said drive means including a first stack of axially aligned elements and a second stack of axially aligned elements, means supporting said first and second stacks of elements for turning about a common axis, a plurality of connector pins each attached to a different element of the first stack and to an element of the second stack having a position in that stack corresponding to the position of the connected element in the first stack, to provide interconnected pairs of elements, said pins being spaced radially from the axis of the elements a similar distance, the elements of said stacks intermediate the front element on the first stack and the rearmost element on the second stack having arcuate slots therein for receiving said pins, said arcuate slots in the elements of the first and second stacks extending in relatively opposite directions from the point of attachment of the pins thereto.

29. A color simulating apparatus comprising a selectively changeable color display screen, said screen including a stack of overlaying color display panels having one side of the stack exposed to provide a display area, each color display panel having a different color on the face thereof, a plurality of overlaying color indicator panels each individual to one of said display panels and having a color corresponding to the respective display panel, means for turning said color display panels at a speed to optically mix the exposed portion of the color display panels, means for adjusting said color display panels relative to each other to expose selectively variable portions of the color display panels, and means operatively connected to said adjusting means for simultaneously adjusting said color indicator panels relative to each other an amount correlative with the adjustment of the color display panels to provide a visual indication of the color composition of the color on the rotating color display panels.

30. A color simulating apparatus comprising a selectively changeable color display screen, said screen including a stack of overlaying color display disks having one side of the stack exposed to provide a display area, each color display disk having a different color on the face thereof, a plurality of overlaying color indicator panels each individual to one of said display disks and having a color corresponding to the respective display disk, means for rotating said color display disks about the axis thereof at a speed to optically mix the exposed portions of the color display disks, said color indicator panels having a generally crescent configuration and having mounting means supporting the same substantially coaxial to said disks outside the periphery of the latter, means for adjusting said color display disks relative to each other to expose selectively variable portions of the color display disks, and means operatively connected to said adjusting means for simultaneously adjusting said color indicator panels relative to each other an amount correlative with the adjustment of the display disks to provide a visual indication of the color composition of the color on the rotating color display disks.

31. A color simulating apparatus comprising a selectively changeable color display screen, said screen including a stack of color disks having one side of the stack exposed to provide a color display area, each color disk having a different color on the face thereof and having a plurality of similar size sectors, the total angular width of which is at least 360°, means for radially supporting and connecting the several sectors of each disk together in fixed relative angular relation to form a continuous color surface, the sectors of the several color disks being interleaved with each other to enable movement of any selected one of the disks wholly or partially to said one side of the stack when the color disks are turned relative to each other, means for selectively turning the disks relative to each other to expose selectively variable portions of the different color disks, means for rotating the several color disks in unison to optically mix the exposed portions of the color disks, said sectors of each disk having an inner edge spaced radially from the axis of the respective disks, said means for supporting and connecting said sectors including a tab on the inner edge of each sector, the angular width of which tab is no greated than $$\frac{360°}{n}$$

where $n$ is the total number of sectors in the color disks, and hub means connected to the tabs and having their outer edges spaced radially from the inner edges of the sectors.

32. The combination of claim 31 wherein the tabs on the sectors of each disk are angularly offset from the tabs on the sectors of the other disks when the sectors of the several disks are angularly aligned with each other.

References Cited in the file of this patent

UNITED STATES PATENTS

| | | |
|---|---|---|
| 2,337,978 | Donovan | Dec. 28, 1943 |
| 2,606,373 | Lamberger | Aug. 12, 1952 |

FOREIGN PATENTS

| | | |
|---|---|---|
| 20,093 | Great Britain | Sept. 5, 1913 |